Oct. 1, 1935.   H. C. ROTH   2,015,731
BRAKE INDICATING DEVICE
Filed April 4, 1932

INVENTOR.
HARRIS C. ROTH
BY Jerome R. Cox
ATTORNEY

Patented Oct. 1, 1935

2,015,731

UNITED STATES PATENT OFFICE 2,015,731

BRAKE INDICATING DEVICE

Harris C. Roth, South Bend, Ind., assignor to Bendix Aviation Corporation, South Bend, Ind., a corporation of Delaware Application April 4, 1932, Serial No. 603,127

2 Claims. (Cl. 177—311)

This invention relates to indicating devices and more particularly to an indicating device adapted to be used for accurately determining the operating conditions of the various automobile brakes of an automotive vehicle.

Prior to my invention, brake condition indicators have been devised in the form of brake testing devices. These have usually been constructed on the principle of measuring the torque of the various brakes while the automobile is supported upon a platform forming a part of the testing machine. Thus such prior art devices are usually incapable of testing brakes under actual operating conditions. My apparatus is designed preferably to be permanently installed on the vehicle and to be operable at any time to determine the condition of the brakes under actual operating conditions. If desired, it may be constructed as a temporary attachment which when attached will also measure actual operating conditions.

One of the objects of my invention is to construct a brake indicating apparatus capable of testing brakes under actual operation conditions.

A further object of the invention is to provide means for determining the relative quality of the braking of the various brakes of an automobile under actual operating conditions while the automobile is on the road.

A further object of the invention is to provide means for determining the heat developed in the various brake shoes when the brakes are applied.

Further objects of the invention will be apparent after a reading of the subjoined specification and claims and after a consideration of the drawing.

In general, my invention contemplates the provision of a device for measuring heat, positioned adjacent to each of the brake shoes of the automobile and in combination therewith, means for indicating at a point convenient to the operator the temperature as measured by these devices. In the embodiment shown, a thermostat is attached to each one of the shoes of each of the brakes and is adapted to control an electric switch so that when the temperature of the shoe reaches a certain point the switch is closed and an electric current is formed. Included in the electric circuit is an electric light bulb or lamp positioned on the dash of the automobile. Thus, when the heat of the brake shoe reaches the predetermined point, the lamp gives an indication to the operator and inasmuch as there is provided a circuit for each of the brakes, the time of the lighting of the first lamp informs him of the relative time required to bring each of the brakes to the predetermined temperature and therefore, the relative braking accomplished by each of the brakes.

In order to explain the invention more clearly, I have shown an embodiment thereof in the accompanying drawing in which.

Figure 1:
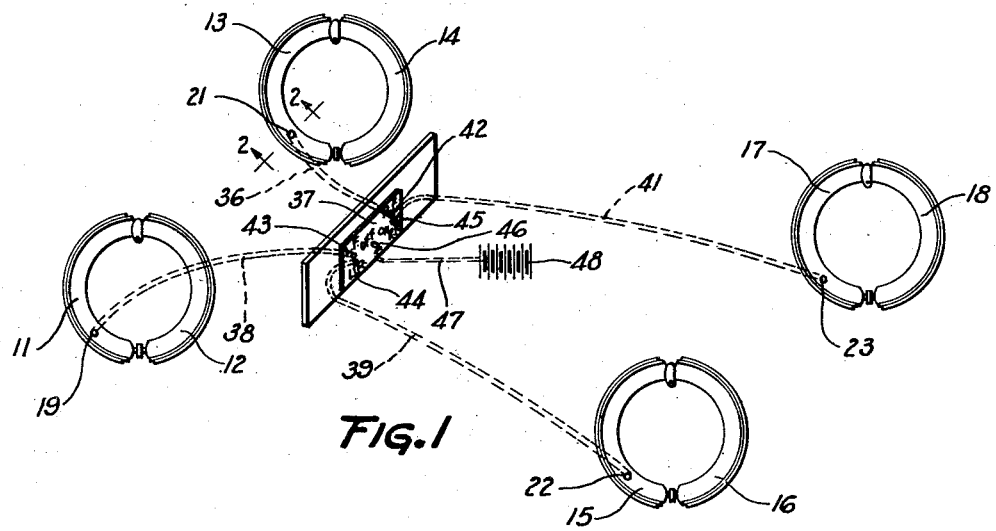
Figure 1 is a diagrammatic view showing an automobile equipped with a brake testing device.
Figures 2, 3:
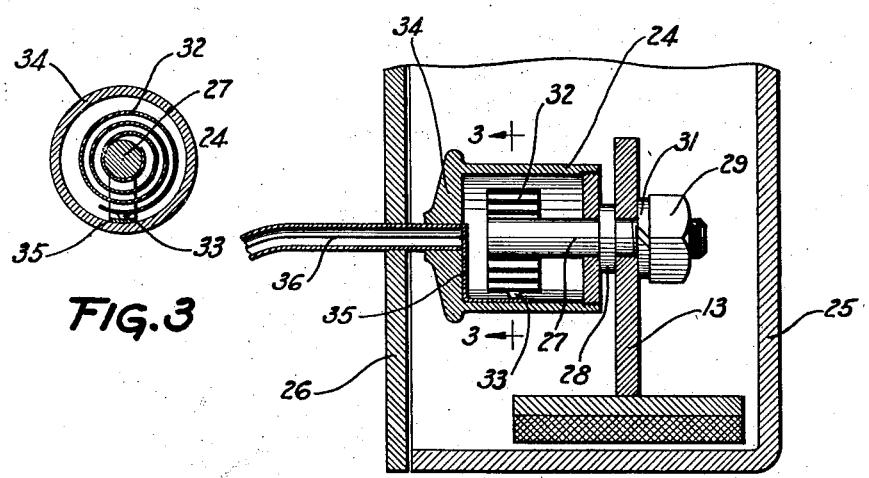
Figure 2 is an enlarged sectional view taken substantially on the line 2—2 of Figure 1.
Figure 3 is a sectional view taken substantially on the line 3—3 of Figure 2.

Referring in detail to said drawing, there is shown diagrammatically in Figure 1, an automobile having two front and two rear wheels. The left front wheel is provided with a brake formed of shoes 11 and 12 and the right front wheel is provided with a brake formed of shoes 13 and 14. The left rear wheel is provided with a brake formed of shoes 15 and 16, and the right rear wheel is provided with a brake formed of shoes 17 and 18. One shoe of each brake is provided as at 19, 21, 22, and 23 with a thermostatic switch such as the switch 24 shown clearly in Figures 2 and 3.

The shoe 13 is associated with a drum 25 and a backing plate 26. The shoe 13 has secured to it as at 21 a heat conducting member 27 formed with a shoulder 28, the member 27 being intimately fastened to the shoe 13 by means of the nut 29 and the washer 31. Connected to the heat conducting member 27 is a thermostatic coil 32 formed of a bi-metallic strip having a metal of low co-efficient of expansion on the outside of the coil and a metal of high co-efficient of expansion on the inside of the coil so that when the strip is heated, the coils tend to expand. The thermostat is inclosed in the bakelite housing 34 which is provided with a contact element 35, with which a contactor 33, carried by the thermostatic strip 32 is adapted to contact when the thermostat is expanded. An electric wire 36 leads from the contact element 35 to the dash 37 of the automobile.

Similar electric wires 38, 39, and 41 connected to thermostatic elements associated with the other brakes also lead to the dash. There, the wires 36, 38, 39, and 41 are connected respectively to electric lamps 42, 43, 44, and 45 each of which has a designation corresponding to the brake with which it is connected. The opposite terminals of all of these lamps are connected to a manually controlled electric switch 46 which has its opposite terminal connected through a wire 47 with a battery 48. The opposite terminal of the battery is grounded to the frame of the automobile, and is connected through the frame and the respective backing plates of the shoes of the brakes and thus with the temperature responsive elements 27.

In the operation of this testing device, the operator turns on the switch 46 and thereafter applies the brakes. The brake exerting the most torque heats most quickly and the thermostat 32 thereof uncoils so that the contactor 33 comes in contact with the contact element 35 and thus completes the electric circuit so that the corresponding lamp is lighted, thus informing the operator which brake is exerting the most torque. If all of the lights appear at substantially the same time, he is informed that his brakes are equalized. By reading in pairs, the top lamps left and right, or the bottom lights left and right, he may be informed of the equalization between the front brakes and the rear brakes respectively.

It may readily be seen that I have provided a brake indicating device capable of operating under actual road conditions and informing the operator as to the relative efficiency of the various brakes of the automobile.

It is to be understood that the above described embodiments of my invention are for the purpose of illustration only and various changes may be made therein without departing from the spirit and scope of the invention.

I claim:

1. For use in combination with an automobile having a pair of wheels and having brakes associated with said wheels, a pair of temperature responsive devices, one associated with each of said brakes, a pair of electric circuits each including a switch controlled by one of said temperature responsive devices and each including an indicating means controlled by said circuit.

2. A vehicle having a plurality of wheels, brakes therefor simultaneously actuatable, friction means therein and heat sensitive electrical means adapted to indicate a predetermined temperature of the friction means of each brake at a common convenient point, to ascertain the relative braking effect of the several brakes.

HARRIS C. ROTH.